Oct. 27, 1959 L. MARTIN 2,910,642

MAGNETIC AMPLIFIER SYSTEM

Filed Sept. 18, 1953 2 Sheets-Sheet 1

INVENTOR.
LYLE MARTIN
BY M. A. Hobbs
ATTORNEY

Oct. 27, 1959 L. MARTIN 2,910,642

MAGNETIC AMPLIFIER SYSTEM

Filed Sept. 18, 1953 2 Sheets-Sheet 2

INVENTOR.
LYLE MARTIN
BY M. A. Hobbs
ATTORNEY

United States Patent Office 2,910,642

Patented Oct. 27, 1959

2,910,642

MAGNETIC AMPLIFIER SYSTEM

Lyle Martin, South Bend, Ind., assignor to Bendix Aviation Corporation, South Bend, Ind., a corporation of Delaware Application September 18, 1953, Serial No. 381,095

3 Claims. (Cl. 323—89)

This invention relates to amplifiers and more particularly to a system for amplifying small direct current signals through an electromagnetic amplification system.

In many of the amplifiers now used, serious problems of stability are presented because of drift caused by temperature variations or by inherent instability of the components within the system. In applications where such measures are justified, relatively complex compensation circuits are employed as stabilizing means. This often results in increased maintenance and also in decreased reliability. It is, therefore, one of the objects of the present invention to provide an amplifier which is inherently reliable.

It is another object of the present invention to provide an amplifier in which instability caused by external conditions or by variations in the characteristics of its components, is substantially eliminated.

It is another object of the present invention to provide an amplifier which is relatively simple in construction and therefore easy to maintain.

It is a further object of the present invention to provide an amplifier which is relatively small and compact, yet not easily damaged by widely varying conditions of temperature and vibration.

A still further object is to provide an amplifier with the above characteristics which is capable of producing a relatively high gain.

Other objects and advantages will be apparent from the following description taken in connection with the accompanying drawings in which.

Figure 1:
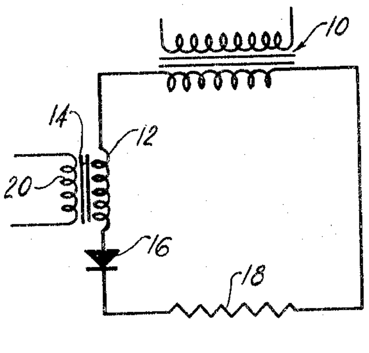
Figure 1 is a schematic diagram of an elementary magnetic amplifier.
Figure 2:
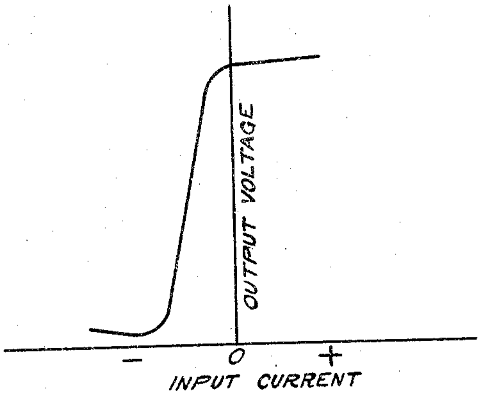
Figure 2 is a typical transfer curve of the elementary magnetic amplifier of Figure 1.

Referring to Figure 1, a source of alternating current is shown in the form of a power transformer 10, in series with which is a power winding 12 wound around a reactor or core 14. Also in series with winding 12 are a dry-disc rectifier 16 and a load resistance 18. The input signal is supplied by a direct current coil 20 which is inductively related to core 14. Because of the action of rectifier 16, the current through coil 12 is essentially a pulsating direct current; consequently, the lines of flux in core 14 do not reverse themselves but are maintained at or near saturation. The addition of a small direct current signal of opposite polarity on winding 20 drives the core out of saturation, thereby greatly increasing the impedance through coil 12 and decreasing its current flow. An amplification is produced because the small direct current signal on winding 20 produces a large increase in voltage drop across coil 12 and necessarily a corresponding decrease in voltage drop across load resistor 18. This operation is indicated on the transfer curve of Figure 2. It will be noted that at zero input current, the output voltage is nearly at a maximum. An increase in input voltage in a positive direction has little effect, but a negative input current, as can be seen by the slope of the curve, very rapidly decreases output voltage. The negative signal has to be of sufficient amplitude, however, to cause the amplifier to operate below the knee of the curve before the greatest amount of amplification can take place. To make it possible to operate on both sides of the point of zero input current, methods have been devised to bias the magnetic amplifier.

Figure 3:
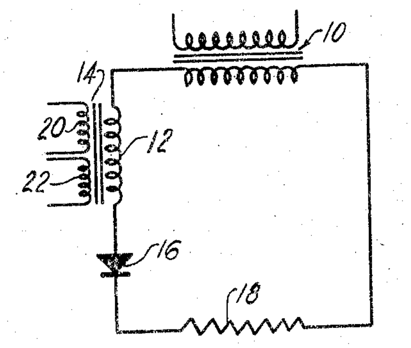
Figure 3 is a schematic diagram of the elementary magnetic amplifier of Figure 1 showing the method of biasing through the use of a separate direct current winding.
Figure 4:
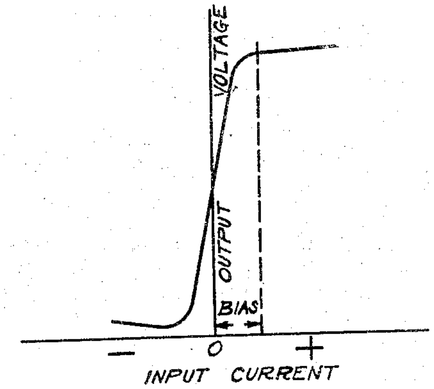
Figure 4 is a graph showing the new position of the transfer curve of the amplifier as a result of the biasing method of Figure 3 or its equivalent.

One such biasing method is shown at Figure 3 in which all components are identical to those of Figure 1 except for the addition of a second direct current control winding 22. When winding 22 is given a steady negative direct current signal, it has the effect of shifting the position of the transfer curve relative to the vertical axis as shown in Figure 4. The amount of bias is indicated by the distance between the vertical axis and the parallel dotted line. With the transfer curve in this position, a small direct current signal on winding 20 of either polarity will cause large corresponding changes in output voltage.

Figure 5:
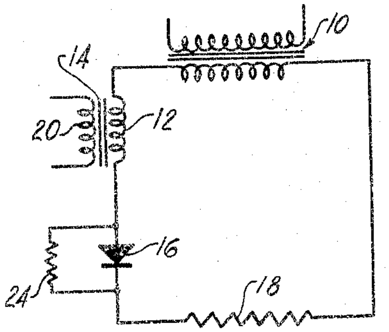
Figure 5 is a schematic diagram of the elementary magnetic amplifier of Figure 1 showing the method of biasing through the addition of a resistor in parallel with the rectifier.
Figure 6:
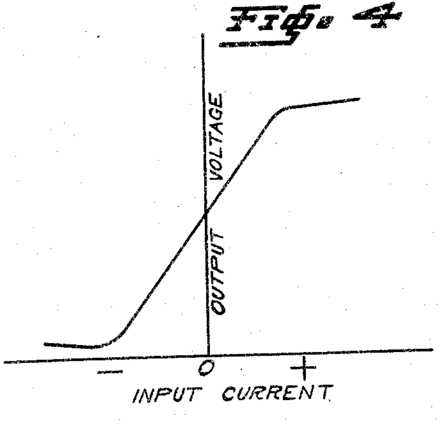
Figure 6 is a graph showing the new position of the transfer curve of the amplifier as a result of using the biasing method of Figure 5.

Figure 5 illustrates a second biasing method which gives a transfer characteristic somewhat different from that of Figure 4. In Figure 5 all components are the same as those of Figure 1 except for resistor 24 which is placed in parallel with rectifier 16. The biasing effect of this rectifier, as shown in Figure 6, is to decrease the slope of the transfer curve, and hence, the gain of the amplifier. It will be observed, however, that the amplifier does operate around a point of zero input, i.e. a signal of either polarity will produce a corresponding change in output voltage.

Shunt resistor 24 has other functions besides serving as a method of biasing. The dry-disc type rectifiers used are subject to increased back leakage from temperature and aging effects which would tend to make the output somewhat unstable unless some provision were made to compensate therefor. Shunt resistor 24 provides this compensation and also provides, if a variable resistance is used, a simple and easily adjustable method of negative feed back. In this magnetic amplifier circuit, as in any amplifier, negative feed-back results in a loss in overall gain and an increase in stability. The feed-back is effected by the shunt resistor-rectifier combination. The value of the resistor together with the value of the reverse resistance of the rectifier determines the degree of negative feed-back. The selection of a value for resistor 24 is therefore a compromise between the degree of temperature stability desired on the one hand and the loss in overall gain due to negative feed-back on the other.

Figure 7:
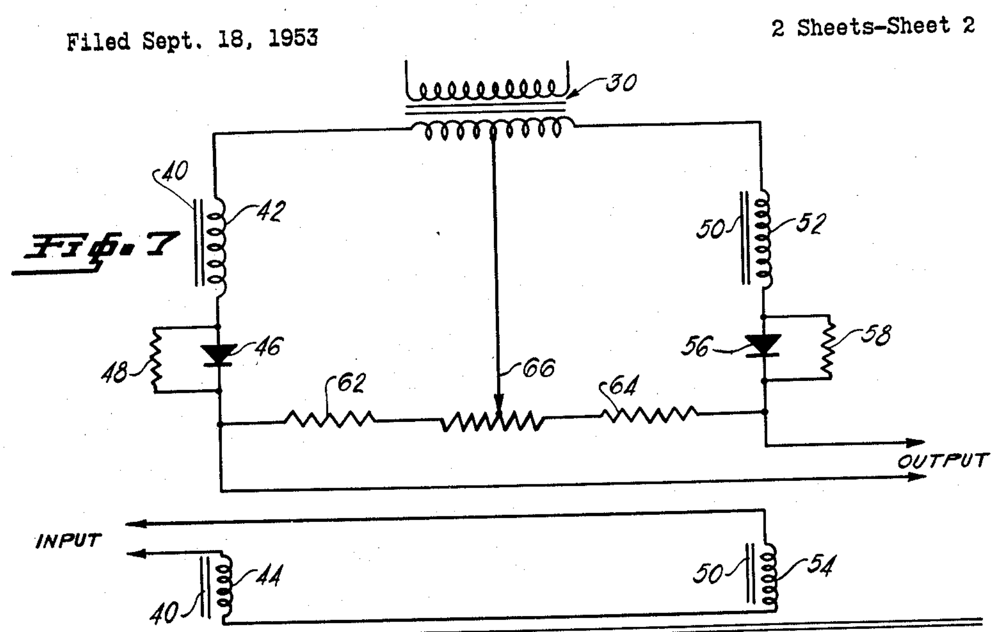
Figure 7 is a schematic diagram of the device of the invention in its simplest form.

In Figure 7 is shown an amplifier embodying two amplifiers like that of Figure 5 arranged in inverse-parallel and with a potentiometer provided so that the outputs of the two amplifiers may be balanced against each other. A power transformer 30 is shown with a center tap and with each side of the secondary winding supplying one side of the amplifier. All coils in a vertical line are wound on the same core, e.g. upon core 40 is wound power winding 42 and direct current signal winding 44. In series with power winding 42 is rectifier 46 which is shunted by resistor 48. Similarly core 50 has wound on itself power winding 52 and signal winding 54, rectifier 56 with shunt resistor 58 being in series with winding 52. Resistors 62 and 64 are load resistors of the left and right branches of the amplifiers respectively, while potentiometer 66 serves to balance the two branches so that there is no output voltage when no signal current is flowing through windings 44 and 54. As soon as a signal is supplied to windings 44 and 54, this balance or cancellation is upset. Assuming this signal current to be flowing downward through coil 44, it must necessarily be flowing up through coil 54. Because each branch of the amplifier has an operating characteristic similar to that shown in Figure 6, it follows that in one branch the signal causes an increased output voltage while in the other branch, the output is decreased. This unbalance results in a voltage being developed across the output which is responsive to changes in the input signals but which carries a much larger amount of power.

Figure 8:
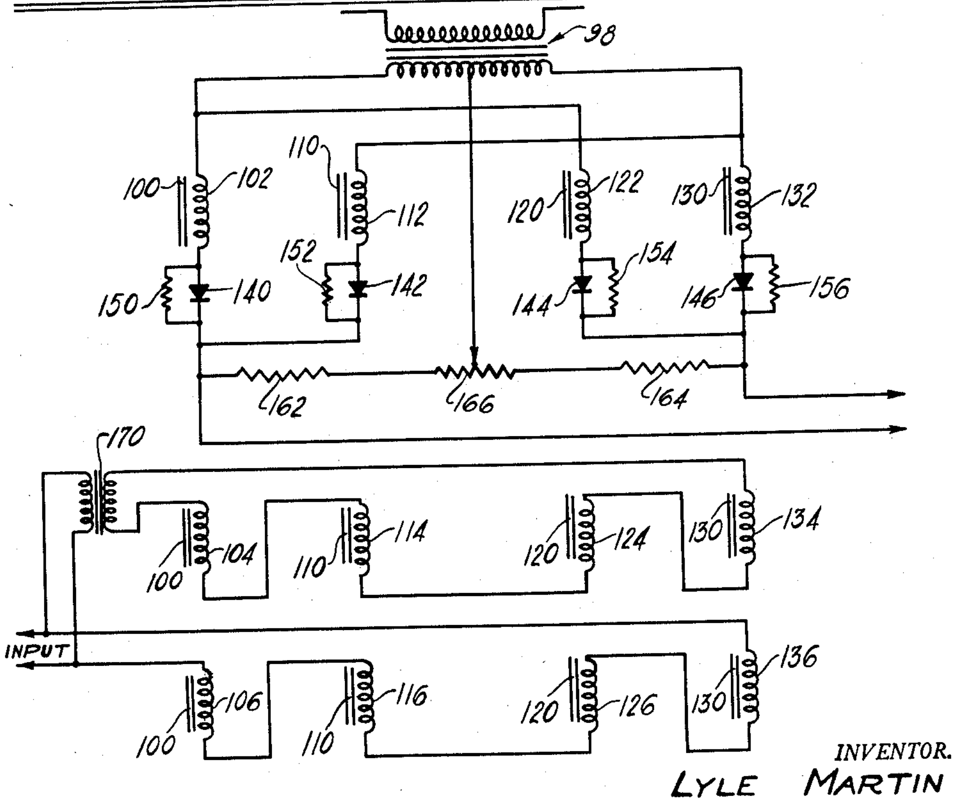
Figure 8 is a schematic diagram of another form of the invention using a full-wave arrangement with additional direct current windings as a stabilizing means.

A further refinement of the invention appears at Figure 8. In this amplifier four of the elementary amplifiers of Figure 5 have been assembled to form a full-wave, inverse-parallel system with additional stabilizing windings employed. These additional direct current windings are employed when the amplifier is part of a closed loop servo system. The alternating current source is shown in the form of transformer 98, while, as in the previously discussed amplifier, all coils in a vertical line are wound on the same core. On core 100 are wound power windings 102 and direct current windings 104 and 106, core 110 carries power winding 112 and direct current signal windings 114 and 116; core 120, power winding 122 and signal windings 124 and 126; and core 130, power winding 132 and signal windings 134 and 136. In series with each of said power windings are dry-disc rectifiers 140, 142, 144, and 146 respectively while shunting each of said rectifiers are resistors 150, 152, 154 and 156 respectively. The output section is much the same as that of Figure 7, the current through coils 102 and 112 flowing through resistor 162, the current through coils 122 and 132 flowing through resistor 164, and the branches being balanced by means of potentiometer 166.

To understand the operation of the device of Figure 8, it is desirable, at this point, to simplify the discussion, by assuming that the reverse current flowing through the rectifiers and shunt resistors is negligible. At any given instant at which the left end of the transformer 98 is positive, current flows through coil 102, rectifier 140, resistor 162 and the left branch of potentiometer 166. At the same time current flows through coil 122, rectifier 144, resistor 164 and the right branch of potentiometer 166. It will be seen that these voltages oppose each other and, if potentiometer 166 is properly positioned, will cancel, giving zero output voltage. In the following half cycle, current flows from the right branch of the secondary of transformer 98 through coil 132, rectifier 146, resistor 164, and the right branch of potentiometer 166. It also flows through coil 112, rectifier 142, resistor 162 and left branch of potentiometer 166. Again, if the impedance values in each branch are the same, the result will be a cancellation of all output voltages. This arrangement is actually a bridge which is balanced in the absence of a signal on the control windings.

If a small direct current signal is now introduced on the main control windings 106, 116, 126, and 136 the balance of impedances through the power windings is upset. With the left branch of the secondary of transformer 98 positive, a signal flowing downward through coil 106 will tend to saturate core 100, thus reducing the impedance through coil 102 while the same signal flowing upward through coil 126 tends to unsaturate core 120 and hence increases the impedance through power coil 122. The result is a greater current flow on the left branch of the output than through the right branch, and a resulting output signal. With the signal current in the same direction as before, assume the output of transformer 98 one-half cycle later. Now it is core 110 which saturates and core 130 which becomes less magnetized, resulting in a decreased impedance through coil 112 and an increased impedance through coil 132. Therefore, as before, the greater current flows through the left branch of the output. Thus it will be seen that so long as the signal current continues to flow in a direction downward through coil 106, the output current will remain in the same direction. Should the signal current be reversed in direction, the output will also be reversed in direction irrespective of the instantaneous polarity of the secondary of transformer 98.

Connected across the input to the main control windings is a transformer 170 which supplies direct current windings 104, 114, 124 and 134. As long as there are no changes in the input signal, no current will flow in these windings, the transformer being unresponsive to a steady direct current signal. Changes in input current, however, are reflected in a secondary of transformer 170 and windings 104, 114, 124 and 134, the direction of the induced current depending upon the direction of the change. In this manner it will be apparent that this second set of windings constitutes a rate or anticipation circuit which is capable of materially reducing the tendency of the servo system of which the amplifier is a part, to oscillate about the point of optimum output.

To one skilled in the art various modifications will occur. The amplifier may be assembled in several stages where power requirements are high. In the output section, the resistors may be replaced by the windings of a motor where it is desirable to create a shaft rotation. Additional stabilizing windings may be employed where necessary. Successful operation is dependent in large measure upon the use of high quality components which will assure that drift in each of the several branches is held to a minimum.

I claim:

1. In combination, a transformer adapted to be connected to an alternating voltage source and having a tapped secondary winding, circuit means providing first and second pairs of electric conducting paths from said secondary winding tap to opposite sides of said secondary winding, each pair of said paths including a different impedance and each one of said paths including a saturable reactor reactance winding and rectifying means for limiting current conduction to flow alternately through different paths of each pair thereof during respective opposite polarity half-cycles of said alternating voltage source, resistance means connected in parallel with each of said rectifying means, saturation control windings arranged in magnetic circuit relation with said reactance windings to have opposite saturation effect upon the reactance windings conductive during the same polarity half-cycles of source voltage and to have oppositely directed magnetic coupling with the reactance windings included in each of said first and second pairs of current paths, load means connected to receive the difference in voltage developed across said impedances including means for balancing said load means to produce zero output when no signal is flowing in said control windings, and stabilization control means including a transformer connected across the input to said control windings and stabilization windings connected to said transformer and arranged in magnetic circuit relation with said reactance windings in the same manner as said control windings for producing saturation effects upon said reactance windings varying with rate of change of said input signal to said control windings.

2. In combination, a transformer adapted to be connected to an alternating voltage source and having a tapped secondary winding, circuit means providing first and second pairs of electric conducting paths from said secondary winding tap to opposite sides of said secondary winding, each pair of said paths including a different impedance and each of said paths including a saturable reactor reactance winding and rectifying means for limiting current conduction to flow alternately through different paths of each pair thereof during respective opposite polarity half-cycles of said alternating voltage source, resistance means connected in parallel with each of said rectifying means, saturation control windings arranged in magnetic circuit relation with said reactance windings to have opposite saturation effect upon the reactance windings conductive during the same polarity half-cycles of source voltage and to have oppositely directed magnetic coupling with the reactance windings included in each of said first and second pairs of current paths, load means connected to receive the difference in voltage developed across said impedances, and stabilization control means including a transformer connected across the input to said control windings and stabilization windings connected to said transformer and arranged in magnetic circuit relation with said reactance windings in the same manner as said control windings.

3. A magnetic amplifier comprising a source of alternating current, a plurality of power coils supplied from and connected in an inverse-parallel, full-wave arrangement to said source, a core of magnetic material inductively related to each of said power coils, a control winding inductively related to each of said cores, a rectifier in series with each power coil, resistance means in parallel with said rectifiers, resistance means in series with said power coils, a potentiometer arranged to balance the outputs of said power coils in such manner as to cause no voltage to be developed across the output of said amplifier unless current is flowing in said control winding, a transformer having its primary winding connected across the input to said control windings, a second set of control windings inductively related to said cores, and the secondary winding of said transformer connected to said second set of control windings.

References Cited in the file of this patent

UNITED STATES PATENTS

| | | |
|---|---|---|
| 2,126,790 | Logan | Aug. 16, 1938 |
| 2,229,952 | Whitely | Jan. 28, 1941 |
| 2,677,099 | Rau | Apr. 27, 1954 |
| 2,677,796 | Geyger | May 4, 1954 |
| 2,734,165 | Lufcy | Feb. 7, 1956 |
| 2,765,374 | Louden | Oct. 2, 1956 |
| 2,768,345 | Ogle | Oct. 23, 1956 |